June 29, 1948.  A. S. BELL ET AL  2,444,089
LAMINATED FABRIC
Filed March 31, 1943

A. S. BELL  Inventors
E. GREENWOOD
By
Attorneys

Patented June 29, 1948

2,444,089

UNITED STATES PATENT OFFICE 2,444,089

LAMINATED FABRIC

Angus Smith Bell and Ernest Leslie Greenwood, Spondon, near Derby, England, assignors, by mesne assignments, to Celanese Corporation of America, a corporation of Delaware Application March 31, 1943, Serial No. 481,204
In Great Britain May 13, 1942

8 Claims. (Cl. 154—48)

This invention relates to fabrics and fabric articles, and especially to multiply fabrics (including two-ply fabrics) the plies of which are united by means of a thermoplastic material, and to articles formed of such fabrics. Such multiply fabrics are referred to below as "laminated fabrics".

We have found that by using for all the plies in a laminated fabric assembly, fabrics having what may be described as structural elasticity, i. e. elasticity due to the structure of the fabric and not to the nature of the textile fibre, and bonding said plies together in such a way that areas in which they are bonded alternate with areas in which they are free, laminated fabrics and fabric articles having a marked elasticity in at least one direction can be obtained. Examples of fabrics having structural elasticity are knitted fabrics and crepe fabrics.

The laminated fabrics of the invention comprise a plurality of fabric plies bonded together at intervals in such a way that along a line parallel to one edge of the laminated fabric, areas in which the plies are bonded alternate with areas in which they are free, each of the fabric plies having structural elasticity in the direction of said line, so that the laminated fabric is elastic in that direction.

Preferably the plies are bonded together by thermoplastic fibres contained in one or more of them. A particularly useful construction comprises an inner ply of fabric, which may be termed the interlining, composed of thermoplastic and non-thermoplastic fibres so distributed that along lines parallel to one edge of the fabric, bands containing thermoplastic fibres alternate with bands containing only non-thermoplastic fibres, the structure of the fabric being such that it is elastic along such lines, and two outer plies, one bonded to each face of the interlining by the thermoplastic fibres in the interlining, these outer plies being structurally elastic in the same direction as the interlining.

Fabrics having the structure specified above for the interlining are believed to be novel. The interlining fabric may be a fabric in which, along lines parallel to one edge of the fabric, bands containing thermoplastic and non-thermoplastic fibres alternate with bands containing only non-thermoplastic fibres, the structure of the fabric being such that it is elastic along such lines. Knitted fabrics having this construction are particularly suitable. Such fabrics may, for example, be formed on a circular knitting machine, with a number of successive feeders each of one or more ends of non-thermoplastic yarn (e. g. cotton) followed by a number of successive feeders each of one or more ends of thermoplastic yarn (e. g. cellulose acetate) and one or more of non-thermoplastic.

The bonds uniting the several fabric plies are preferably provided by thermoplastic fibres contained in the interlining. These fibres are preferably plasticised. The plasticiser can be introduced in various ways but we prefer to apply it in solution in a volatile liquid which is a non-solvent for the thermoplastic material, to the interlining. After drying, and preferably ageing at an elevated temperature to facilitate preferential absorption by the thermoplastic fibres, the interlining can be washed in the volatile liquid to remove plasticiser from the non-thermoplastic fibres. The ageing can, with advantage, be effected in a moist atmosphere. Such methods of plasticising the thermoplastic fibres in an interlining fabric are described, for instance, in U. S. Patents Nos. 2,323,121, 2,326,128 and 2,326,189.

The outer-ply fabric may be a knitted fabric of unplasticised thermoplastic fibres or non-thermoplastic fibres or both. It must, of course, have structural elasticity in the same direction as the interlining. In the case of a three-ply fabric the two outer plies may be separate or may be formed by folding a single fabric. This may be folded so as to envelop the interlining, as described for example in Patent No. 2,377,933.

The bonding together of the plies by the thermoplastic fibres contained in one or more of them, may be effected by pressing the assembly of fabric plies at an elevated temperature. When the assembly consists of an interlining containing plasticised thermoplastic fibres and outer plies containing unplasticised thermoplastic fibres, the conditions of pressing should be such as to render the plasticised fibres, but not the unplasticised fibres, adhesive. The bonding may be assisted by the presence of water or a volatile liquid having softening or even solvent properties for the thermoplastic material, at the temperature of pressing, but care must, of course, be taken not to damage the fabrics treated, for instance by pressing at temperatures too high, or for too long, or by allowing outer plies containing thermoplastic fibres to be attacked by solvent liquids.

One method of forming sweat bands for hats, according to the invention, will now be described with reference to the accompanying diagrammatic drawings wherein.

Figure 1:
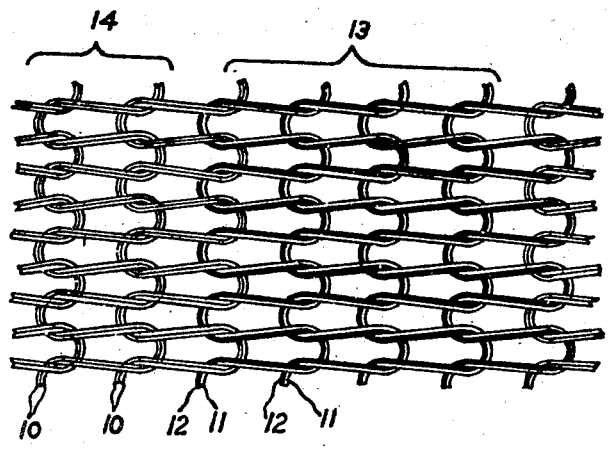
Fig. 1 is a plan view of part of an interlining fabric for use in the production of laminated fabrics from which sweat bands can be cut.

The interlining fabric is knitted on a 12-feeder circular knitting machine having 8 successive feeders of two ends 10 of 40 count cotton each, followed by four successive feeders of one end 11 of 40 count cotton and one end 12 of 140 denier cellulose acetate each. This results in a fabric in which bands of cellulose acetate in admixture with cotton (one of such bands is indicated by the reference numeral 13 of Fig. 1) alternate with bands of cotton alone (a part of one such band is indicated by reference numeral 14 on Fig. 1).

The cellulose acetate yarn in the interlining fabric is plasticised by immersing the fabric in a solution of a plasticiser, for example:

About 52 parts by volume dimethylglycolphthalate
About 4 parts by volume triacetin and
About 144 parts by volume industrial alcohol, drying the fabric, heating it for about one minute at a temperature of about 100° C., ageing it for at least 24 hours at a temperature of 30–40° C. and repeating the washing, drying and ageing steps, if necessary, until the fabric is free from stickiness, and substantially the whole of the plasticiser present is carried by the cellulose acetate yarn.

Figure 2:
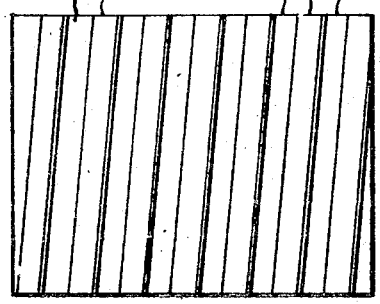
Fig. 2 is a plan view on a smaller scale of a portion of laminated fabric suitable for the purpose referred to, and formed by bonding together under heat and pressure two plies of knitted all-cellulose acetate fabric and an intermediate ply of the interlining fabric shown in Fig. 1.
Figure 3:
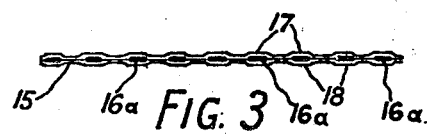
Fig. 3 is a sectional elevation of the laminated fabric shown in Fig. 2 taken parallel to its length.

When the plasticised interlining is sandwiched between two plies of all-cellulose acetate knitted fabric and the assembly is pressed between sheets of closely woven cotton material in a platen-press with the bottom plate covered with woolen blanket material and the platens at a temperature of about 120° C., the three plies are united forming a laminated fabric of the structure shown in Figs. 2 and 3 where bands 15 in which the cellulose acetate yarns of the interlining have coalesced with the cellulose acetate yarns of the two outer layers alternate with bands 16 in which the cotton courses 16a are sandwiched between but not united to two layers 17 and 18 of cellulose acetate.

Figure 4:
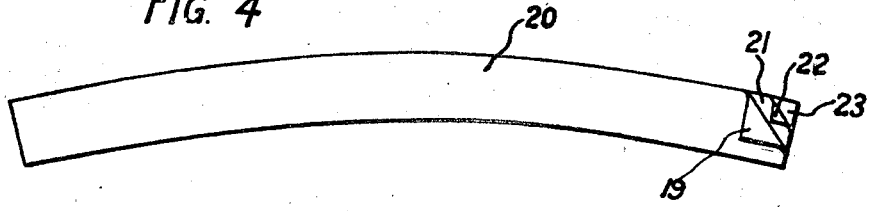
Fig. 4 is a plan view on a still smaller scale of a sweat band cut from the laminated fabric shown in Figs. 2 and 3, the component fabrics being separated and turned back at one corner to show the construction.

From a sheet of laminated fabric of Figs. 2 and 3, a sweat band of the form shown in Fig. 4 is cut in a direction substantially parallel to the length of the fabric, i. e. substantially perpendicular to the alternating bands of all-cotton and cellulose acetate-cotton in the interlining. In Fig. 4 a corner 19 of one of the outer plies 20 has been turned back to reveal a portion 21 of the interlining and a corner 22 of this has been turned back to reveal the inner surface of the other outer ply 23.

Various methods may be adopted to prevent ravelling at the cut edges of the fabric plies. One method is to do the cutting with a hot knife. A second method is to mark out on the sheet of laminated fabric, the lines along which the sweat band or other article is to be cut out, with a "dope pencil," i. e. a pencil-shaped container filled with a suitable dope (e. g. a solution of cellulose acetate in acetone) and adapted to trace out a line of dope when drawn across the fabric. After marking out the lines in this way the sweat band is cut out, while the dope is still liquid so that it serves to stick together the fibres at the cut edges. A third method is to apply a volatile solvent for the thermoplastic material, to the cut edges, e. g. from a pad or cloth. Yet another method is to pass the cut edges through a flame.

Sweat bands made as described above have a noticeable elasticity in the direction of their length quite beyond that of similar articles in which the plies are formed from woven fabrics or from knitted fabrics united over their whole area. By reducing the width of the bands containing the thermoplastic yarns in relation to the width of the bands of non-thermoplastic yarns a still greater elasticity is obtainable whereas if the width of the bands containing thermoplastic yarns be increased at the expense of the bands of non-thermoplastic yarns a lower elasticity results.

In a similar way to that described for the production of sweat bands, other laminated fabric articles which are desired to have elasticity in one direction can be made, for instance, chain-straps for hats and helmets, belts, components for braces, garters and military body-harness, including the head-harness of respirators. Laminated fabrics and fabric articles having a substantial elasticity in at least one direction, although formed of fibres which are inelastic, are novel and the invention includes such fabrics and their production broadly.

In carrying out the invention, variations in detail from the method described above can be made while still carrying out the broad principle of the invention. Thus, for instance, instead of employing circular knitted fabric of construction such as that specified above for the interlining, a warp knitted fabric in which bands of non-thermoplastic yarns alternate with bands containing both thermoplastic and non-thermoplastic yarns may be employed. As in the case of the circular knitted fabric the bands must run transversely to, and preferably substantially perpendicular to, the direction in which elasticity is required. The bands containing the thermoplastic yarns may contain no other yarns, but with a view to obtaining maximum strength in the product it is preferable for these bands to contain non-thermoplastic yarns in admixture with the thermoplastic yarns. This construction also allows control of the air-permeability of the laminated fabric, according to the proportion of thermoplastic to non-thermoplastic fibre.

Instead of knitted fabrics other structurally elastic fabrics may be used in the interlining. Thus for example the interlining may be a woven fabric containing crepe twisted yarns so disposed as to give structural elasticity in the desired direction. The fabric may be woven from a warp comprising bands of non-thermoplastic yarns alternating with bands containing both thermoplastic and non-thermoplastic yarns, and filled with a non-thermoplastic crepe-weft. Such a fabric has structural elasticity in a weft-wise direction, and a suitable interlining for sweat bands or other long narrow articles may be cut from it so as to have its longer dimension parallel to the weft, and used in the same way as the knitted interlinings described above. Interlinings containing crepe yarns in both warp and weft may also be used.

The outer plies of the laminated fabric are preferably formed of a knitted fabric of cellulose acetate or like thermoplastic fibre; for instance, fibres of any of the thermoplastic materials referred to below in connection with the interlining may be used. The use of fibres of this nature is particularly desirable in the case of sweat bands and other articles which in use are worn next to the skin since the hydrophobe nature of these fibres prevents undue wetting of the material by perspiration. A still greater degree of resistance to penetration by perspiration may be obtained by applying a water-proofing treatment, for instance a treatment with wax, ethyl cellulose, rubber or a rubber-like synthetic resin, in solution or aqueous dispersion, or with water-insoluble soaps, for instance aluminium stearate, to one or both of the outer plies of the laminated fabric. This treatment may be applied before uniting the plies to the interlining. The outer plies may, on the other hand, be formed of non-thermoplastic fibres, for instance cotton, linen, or other vegetable fibres, silk, wool or other animal fibres, but in this case a product much less resistant to penetration by moisture is obtained. Artificial proteinaceous fibres or fibres of condensation polymers of diamines with dicarboxylic acids, e. g. polyhexamethylene adipamide and like fibre-forming polymers, may also be used.

Although in the preferred form of the invention the bonds for uniting the plies are provided by plasticised fibres contained in bands spaced apart from one another by bands containing only non-thermoplastic fibres, this is not the only method of carrying out the invention. Thus, for example, a structurally elastic interlining may be used containing thermoplastic fibres throughout, preferably in admixture with non-thermoplastic, and at intervals along the line in which elasticity is required in the product, bands of thermoplastic fibre may be rendered adhesive or potentially adhesive (i. e. capable of becoming adhesive at an elevated temperature) by the local application of a plasticiser or solvent, for instance in the form of a dope. Reliance may be placed entirely on a dope or other adhesive locally applied to one or more of the structurally elastic plies to be united and in this case it is unnecessary for any of the plies to contain thermoplastic materials. Superior products, however, are obtained when the bonds for adhesion are provided by fibres contained in at least one of the plies to be united.

The invention has been described with particular reference to the production of three-ply fabrics. The principle of the invention can, however, be put into practice using only two plies, each being of a structurally elastic fabric and at least one containing thermoplastic yarns. The invention also includes the production of elastic laminated fabrics formed from more than three plies of material, for instance five or seven plies, the same principles being applied in the production of such fabrics as have been described in connection with three-ply fabrics.

Excellent results have been obtained using cellulose acetate as the thermoplastic material of the interlining. Other thermoplastic non-elastic fibre-forming materials can be employed however. Among such materials are other organic derivatives of cellulose, for example cellulose propionate, cellulose butyrate, cellulose acetate-propionate, cellulose acetate-butyrate, cellulose acetate-nitrate, cellulose acetate-stearate, ethyl cellulose, propyl cellulose, benzyl cellulose, ethyl cellulose acetate and ethyl hexyl cellulose. Cellulose esters containing the radicles of acetic acid and a higher fatty acid are specially useful. Polymerised unsaturated fibre-forming substances can also be used, for instance polyvinyl acetate (where a low softening point is not undesirable), polyvinyl chloride, polyvinyl chloride-acetate, polyvinyl chloracetate, polystyrene and polymers of acrylic acid and its derivatives. In the case of most of these thermoplastic fibre-forming substances it is necessary, in order to obtain good adhesion between the plies, to have a plasticiser present.

Suitable plasticisers for the organic derivatives of cellulose referred to include lower alkyl phthalates, for example dimethyl phthalate, lower alkoxy alkyl phthalates, for example dimethoxy ethyl phthalate, lower alkyl phthallyl glycollates, for example methyl phthallyl ethyl glycollate, tri-(monochlorethyl) phosphate, triethyl citrate, diethyl tartrate and esters of glycerine, for instance triacetin and tripropionin. Phosphoric esters such as tricresyl phosphate, tributyl phosphate and triethyl phosphate may also be employed, preferably in admixture with a greater proportion of one of the plasticisers specified above, having a greater affinity for the cellulose derivative than the phosphorus ester. The plasticiser is preferably applied to the interlining containing the thermoplastic fibres by a bath treatment and excess of plasticiser removed after an ageing step, as described above. For application to thermoplastic materials which, like cellulose acetate, are insoluble in ethyl alcohol, ethyl alcohol forms a suitable medium in which to apply the plasticiser. Introduction of the plasticiser into the thermoplastic fibres of the interlining before weaving, or in the spinning of those fibres, is a much less convenient method.

Having described our invention what we desire to secure by Letters Patent is:

1. A laminated fabric comprising a plurality of fabric layers all of which have structural elasticity in the same direction, said layers being bonded together at intervals by bands of thermoplastic yarns present in one layer, said bands running perpendicular to said direction and alternating with bands of non-thermoplastic yarns, whereby the laminated fabric has structural elasticity in said direction.

2. A laminated fabric comprising a plurality of knitted fabric layers all of which have structural elasticity in the same direction, said layers being bonded together at intervals by bands of thermoplastic yarns present in one layer, said bands running perpendicular to said direction and alternating with bands of non-thermoplastic yarns, said layer being of fabric formed by knitting on a circular knitting machine with a number of successive feeders each of two ends of non-thermoplastic yarn followed by a smaller number of feeders each of one end of thermoplastic yarn and one end of non-thermoplastic yarn, whereby the laminated fabric has structural elasticity in said direction.

3. A laminated fabric in accordance with claim 1 wherein the bonding fabric layer is composed of thermoplastic and non-thermoplastic fibres so distributed that along lines parallel to one edge of the fabric, bands containing thermoplastic fibres alternate with bands containing only non-thermoplastic fibres, the structure of the fabric being such that it is elastic along such lines.

4. A laminated fabric in accordance with claim 1 wherein the bonding fabric layer is composed of thermoplastic and non-thermoplastic fibres so distributed that along lines parallel to one edge of the fabric bands containing thermoplastic and non-thermoplastic fibres alternate with bands containing only non-thermoplastic fibres, the structure of the fabric being such that it is elastic along such lines.

5. A laminated fabric in accordance with claim 1 wherein the bonding fabric layer is a knitted fabric composed of thermoplastic and non-thermoplastic fibres so distributed that bands containing thermoplastic and non-thermoplastic fibres alternate with bands containing only non-thermoplastic fibres.

6. A laminated fabric in accordance with claim 1 wherein the bonding fabric layer is a knitted fabric composed of thermoplastic and non-thermoplastic fibers so distributed that bands containing thermoplastic and non-thermoplastic fibers alternate with bands containing only non-thermoplastic fibers, said fabric being formed by knitting on a circular knitting machine by a number of successive feeders each of two ends of non-thermoplastic yarn, followed by a smaller number of feeders each of one end of thermoplastic and one of non-thermoplastic yarn.

7. A laminated fabric in accordance with claim 1 wherein the bonding fabric layer is a knitted fabric composed of thermoplastic and non-thermoplastic fibers so distributed that bands containing thermoplastic and non-thermoplastic fibers alternate with bands containing only non-thermoplastic fibers, the thermoplastic fibers in said fabric being plasticized and the non-thermoplastic fibers being substantially free from plasticizer.

8. A laminated fabric in accordance with claim 1 wherein the bonding fabric layer is a knitted fabric composed of thermoplastic and non-thermoplastic fibers so distributed that bands containing thermoplastic and non-thermoplastic fibers alternate with bands containing only non-thermoplastic fibers, said fabric being formed by knitting on a circular knitting machine by a number of successive feeders each of two ends of non-thermoplastic yarn, followed by a smaller number of feeders each of one end of thermoplastic and one of non-thermoplastic yarn, the thermoplastic fibers in said fabric being plasticized and the non-thermoplastic fibers being substantially free from plasticizer.

ANGUS SMITH BELL.
ERNEST LESLIE GREENWOOD.

REFERENCES CITED

The following references are of record in the file of this patent:

UNITED STATES PATENTS

| Number | Name | Date |
| --- | --- | --- |
| 2,126,754 | Dreyfus | Aug. 16, 1938 |
| 2,126,755 | Dreyfus | Aug. 16, 1938 |
| 2,126,758 | Dreyfus | Aug. 16, 1938 |
| 2,126,759 | Dreyfus | Aug. 16, 1938 |
| 2,126,821 | Schneider | Aug. 16, 1938 |
| 2,126,822 | Schneider | Aug. 16, 1938 |
| 2,126,824 | Schneider | Aug. 16, 1938 |
| 2,281,646 | Whitehead | May 5, 1942 |